United States Patent [19]
Fujikura et al.

[11] Patent Number: 6,065,955
[45] Date of Patent: May 23, 2000

[54] APPARATUS FOR RECOVERING FLATNESS OF WEB MATERIAL

[75] Inventors: Daisuke Fujikura; Naoaki Suzuki, both of Minami-Ashigara, Japan

[73] Assignee: Fuji Photo Film Co., Ltd., Kanagawa, Japan

[21] Appl. No.: 09/221,845

[22] Filed: Dec. 29, 1998

Related U.S. Application Data

[62] Division of application No. 08/598,216, Feb. 7, 1996, Pat. No. 5,879,606.

[30] Foreign Application Priority Data

Feb. 7, 1995 [JP] Japan ................................ 7-019021

[51] Int. Cl.⁷ ..................................... B29C 35/10
[52] U.S. Cl. ................... 425/174.4; 425/445; 425/383; 219/405; 219/411; 392/422; 392/426
[58] Field of Search ................ 425/174.4, 445, 425/383, 363, 174.2; 264/442, 476, 492; 219/391, 402, 403, 405, 411; 392/416, 418, 422, 426, 427, 431

[56] References Cited

U.S. PATENT DOCUMENTS

| | | | |
|---|---|---|---|
| 2,779,684 | 1/1957 | Alles | 425/174.4 |
| 3,502,765 | 3/1970 | Spencer | 264/284 |
| 3,939,000 | 2/1976 | Arvidson, Jr. et al. | 96/87 R |
| 4,141,735 | 2/1979 | Schrader et al. | 96/75 |
| 4,226,825 | 10/1980 | Yamagis et al. | 264/235 |
| 5,149,393 | 9/1992 | Hutchinson et al. | 156/555 |
| 5,312,646 | 5/1994 | Barbee et al. | 427/177 |
| 5,525,287 | 6/1996 | Van Erden et al. | 425/174.4 |

FOREIGN PATENT DOCUMENTS

| | | |
|---|---|---|
| 2 316 484 | 10/1974 | Germany . |
| 24 06 955 A1 | 9/1975 | Germany .............. 425/174.4 |
| 61-74828 | 4/1986 | Japan . |
| 62-127229 | 6/1987 | Japan . |
| 1211883 | 8/1989 | Japan . |

OTHER PUBLICATIONS

Patent Abstracts of Japan, vol. 012, No. 195 (M–705), Jun. 7, 1988, & JP 63 001523 A (Dan Sangyo KK), Jan. 6, 1988, *abstract.

Patent Abstracts of Japan, vol. 004, No. 076 (M–014), Jun. 3, 1980, & JP 55 037333 A (Nippon Synthetic Chem Ind Co Ltd:The), Mar. 15, 1980, *abstract.

Patent Abstracts of Japan, vol. 011, No. 006 (M–551), Jan. 8, 1987, & JP 61 185430 A (Teijin Ltd), Aug. 19, 1986, *abstract.

*Primary Examiner*—Robert Davis
*Assistant Examiner*—Thukhanh T. Nguyen
*Attorney, Agent, or Firm*—Sughrue, Mion, Zinn, Macpeak & Seas, PLLC

[57] ABSTRACT

The present invention provides a method for recovering flatness of a web material which comprises heating a side edge portion of the web material at a temperature in a range from a glass transition temperature minus 40° C. to a melting point of the web material for a period of from 1 to 600 seconds, and an apparatus for recovering flatness of a web material which comprises a plurality of conveying rollers for conveying the web material and a side edge portion heating means which surrounds and heats the side edge portion of the web material traveling through conveying rollers. According to the method and apparatus, the side edge portion(s) elongated by the previous heat treatment is recovered to a state similar to the central portion by reheating to correct the side edge portion(s), and thereby, flatness of the web material can be improved.

8 Claims, 4 Drawing Sheets

1

APPARATUS FOR RECOVERING FLATNESS OF WEB MATERIAL

This is a divisional of application Ser. No. 08/598,216 filed Feb. 7, 1996 now U.S. Pat. No. 5,879,606 the disclosure of which is incorporated herein by reference.

BACKGROUND OF THE INVENTION

This invention relates to a method for recovering flatness of a web material which corrects elongation at side portions of the web material occurring caused by heat treatment for the purpose of the improvement in properties and dimensional stability, and an apparatus therefor.

There are laminated plastic films containing a light-selective membrane, a transparent conductive membrane, etc. which are used in optical or electrical technical fields. The laminated plastic film is heat-treated for the purpose of the improvement in dimensional stability upon heating, of the adjustment of strength, elongation or shrinkage, of drying, polmerization or curing a surface layer coated onto a surface of the film.

Several heat treatment methods of the laminated plastic film are disclosed in Japanese Patent KOKAI 61-74828, 62-127229, etc. In the heat treatment disclosed in Japanese Patent KOKAI 61-74828, one or both side edges of the plastic film are thickened so as to form a space between adjacent film turns upon being wound. In the heat treatment disclosed in Japanese Patent KOKAI 62-127229, the plastic film is heated in an oven up to almost the heat treatment temperature, meanwhile spacers are superposed at least on both side edges of the plastic film. The plastic film heated in the oven is wound up into a roll together with the spacers, and the roll containing spacers which intervene between adjacent film turns is kept at the heat treatment temperature for a predetermined time.

In the above conventional methods, the plastic film is wound to form a roll in a state that either one side edge or both side edges are thickened or accompanied with spacers, and then, heat-treated. Therefore, stress generated in the roll is concentrated on the one side edge or both side edges. Since the roll is heated up to around a glass transition temperature, creep elongation occurs at the side edges greater than the central portion, to degrade flatness. As a result, coating suitability in a subsequent process and transportation suitability are degraded, and loss in product yield increases.

SUMMARY OF THE INVENTION

An object of the invention is to provide a method for recovering flatness of a plastic film wherein, side edge(s) is elongated up to a good state prior to heat treatment, and thereby capable of improving coating suitability, transportation suitability, and so on.

Another object of the invention is to provide an apparatus used therefor.

The present invention provides a method for recovering flatness of a web material which has achieved the above object, comprising heating a side edge portion of the web material at a temperature in a range from a glass transition temperature minus 40° C. to a melting point of the web material for a period of from 1 to 600 seconds.

The present invention also provides an apparatus for recovering flatness of a web material which has achieved the above object, comprising a plurality of conveying rollers and a side edge portion heating means.

Figure 1:
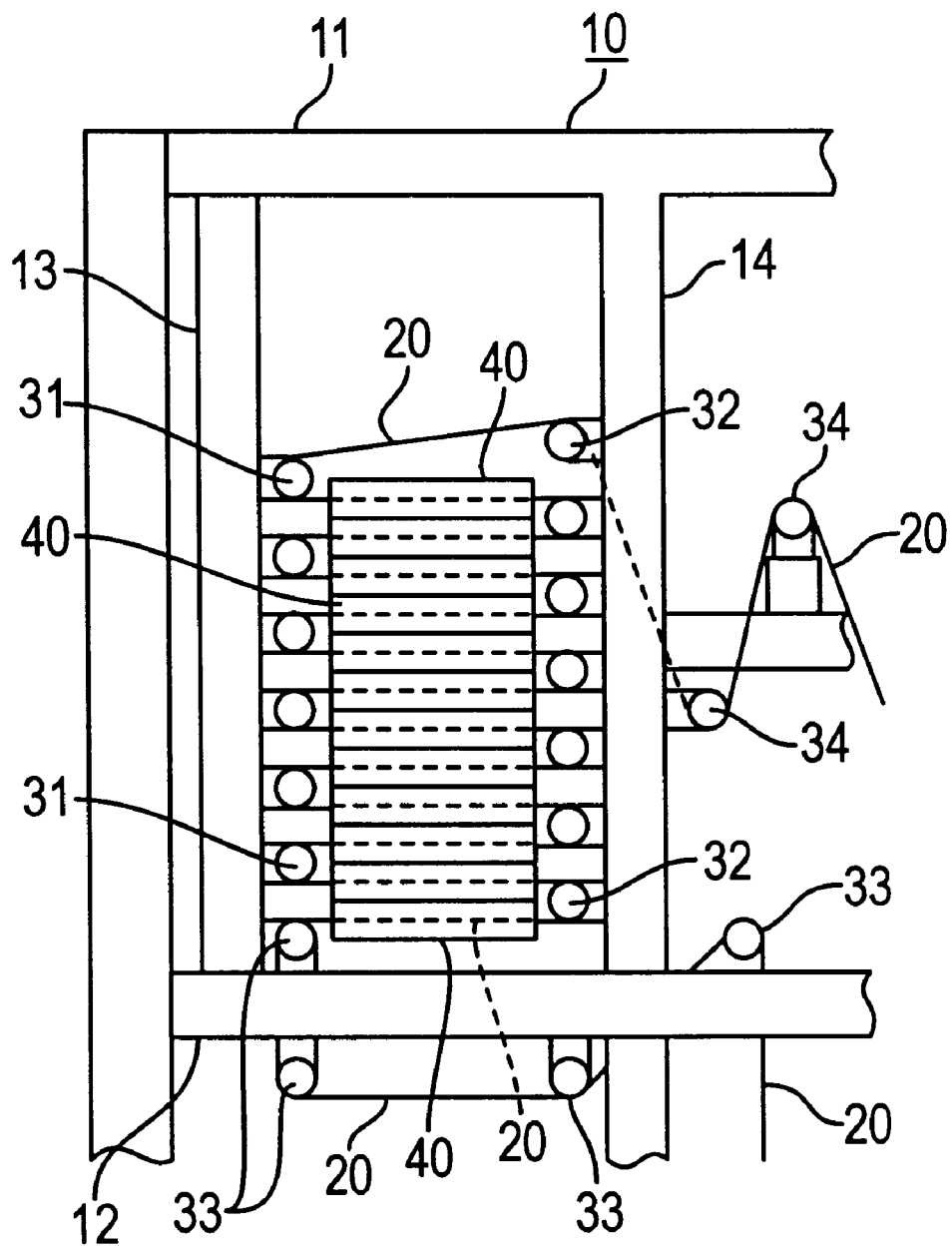
FIG. 1 is a side view of an apparatus for recovering flatness of a web material embodying the invention.

10 . . . Frame
20 . . . Web material
21 . . . Side edge portion
31, 32 . . . Conveying roller
40, 50 . . . Side edge portion heating means
41, 51 . . . Trough-formed member (surrounding member)
42, 52 . . . Heater

DETAILED DESCRIPTION OF THE PREFERRED EMBODIMENTS

Suitable heating conditions for recovering flatness are at a temperature in a range from a glass transition temperature, minus 40° C., to a melting point of the web material for a period of from 1 to 600 seconds, preferably from the glass transition temperature, minus 20° C., to the melting point, minus 40° C., for a period of from 1 to 100 seconds, more preferably from the glass transition temperature to the melting point minus 80° C., for a period of from 2 to 60 seconds. When the heating temperature is less than the glass transition temperature minus 40° C., to correct the elongation occurring at side edge portion(s) is difficult due to the small shrinkage of the web material. When the heating temperature exceeds the melting point, the web material curls due to increased softening, or in an extreme case, is melted. In order to minimize destruction of the molecular arrangement by the reheating, it is preferable to heat at around a glass transition temperature, i.e. in a range from the glass transition temperature to the temperature plus 40° C., The heating time of shorter than one second is too short for recovering flatness of the web material. The heating time of longer than 600 seconds requires a long flatness-recovering apparatus resulting in degrading manufacturing equipment efficiency. The heating temperature can be controlled by changing temperature or the number of heaters, heating time, heating distance, traveling speed, etc.

The side edge portion(s) to be heated in the invention almost correspond to the part(s) more elongated than the central part by the heat treatment, and almost correspond to the thickened part or the part on which spacer(s) are superposed. Accordingly, the width of the side edge portion(s) vary according to the full width of the web material, etc., and in general, 1 to 3% of the full width of the web material. For example, in the case of the web material having a width of about 1,500 mm, the width of the side edge portion is, about 30 mm from a side edge.

The side edge portion heating means surrounds and heats the side edge portion(s) of the web material, and comprises a member surrounding the side edge portion and a heating member. The surrounding member causes heat to be utilized efficiently for heating the side edge portion, i.e. restricts heating area to the side edge portion, and surrounds the edge and both sides of the side edge portion. The form and materials of the surrounding member are not limited, but the inner surface is preferably rendered so as to reflect heat. Illustrative of the heating members are infrared heaters, e.g. far infrared heater, middle infrared heater, ultrasonic heaters, etc.

The heating employed for recovering flatness is different from the preceding heat treatment in that it is conducted against the web material directly for a short time in real time or in machine process.

As the web material applicable to the invention, there are polyester films, polyethylene films, polystyrene films, polyvinyl alcohol films, polyvinyl chloride films, polyvinylidene chloride films, teflon films, nylon films, polypropylene films, polycarbonate films, polyimide films, polyamide-imide films, polyester-imide films, etc. The size of the web material is not limited, and in general, has a width of from 500 to 5000 mm, particularly from 1000 to 2000 mm, and a thickness of from 10 to 500 $\mu$m, particularly from 50 to 200 $\mu$m. In the case that the web material is a laminated film, the glass transition temperature and the melting point of the web material are those of the thickest layer, in general, the support layer.

The thickening of the web material applied to the flatness-recovering method and the apparatus of the invention can be conducted by the cold mechanical method, the method of using an embossing roller heated to higher than the melting point of the film.

As the use of the web material of the invention, there are the support for photographic photosensitive materials, support for magnetic recording materials, the support for light-selective light-transmissive membranes, the support for transparent conductive membranes, etc.

In the method for recovering flatness of a web material of the invention, the side edge portion(s) elongated by the previous heat treatment is recovered to a state similar to the central portion by reheating to correct the side edge portion (s), and thereby, flatness of the web material can be improved. As a result, coating suitability (uneven coating caused by elongation, air entrapment, trimming, etc.) and transpotation suitability (slippage, meandering, weaving. etc.) can be improved. Due to not heating the central portion, destruction of the arrangement of molecules formed by the heat treat is minimized occurring through reheating.

In the apparatus of the invention, the surrounding member surrounds a side edge portion of the web material. The surrounding member inhibits heat of a heater from irradiating to the central portion of the web material as little as possible, and concentrates the heat to the side edge portion.

An apparatus for recovering flatness of a web material of the invention is illustrated in FIGS. 1 to 4.

Referring to FIG. 1 which is a side view of the apparatus, a frame 10 of the apparatus is formed rectangular by an upper frame 11, a lower frame 12, a left frame 13 and a right frame 14. A plurality of conveying rollers 31, 32 for conveying a web material 20 are mounted to the left frame 13 and the right frame 14 alternately at an interval almost the same as the diameter of conveying rollers 31, 32. That is, the level of the upper end of the conveying roller 31 (32) mounted to one frame 13 (14) is almost consistent with the lower end of the conveying roller 82 (31) mounted to the other frame 14 (13), and the level of the lower end of the conveying roller 31 (32) mounted to the one frame 13 (14) is almost consistent with the upper end of the conveying roller 32 (31) mounted to the other frame 14 (13) located underneath. Thus, the web material 20 moves almost horizontally, and turns many times thereby forming a serpentine path. Besides, a plurality of feed rollers 33 are mounted to the under frame 12 for feeding the web material 20, and a plurality of transfer rollers 34 are mounted on the outside of the right frame 14 for conveying the web material 20 of which flatness has been recovered by heating to a subsequent process.

Figure 2:
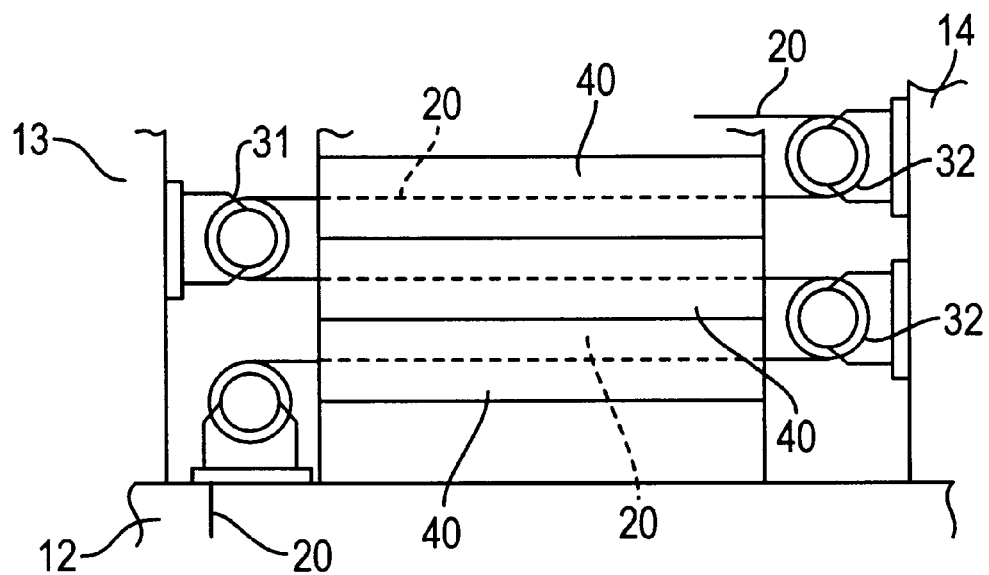
FIG. 2 is an enlarged partial view thereof.
Figure 3:
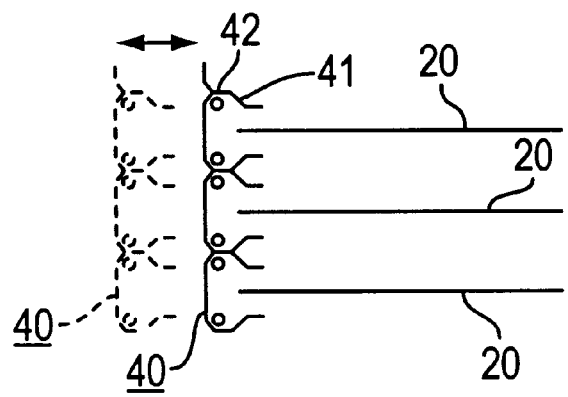
FIG. 3 is a partial front view around the side edge portion heating means and FIG. 4 is an enlarged partial view thereof.

As shown in FIGS. 2 and 3, side edge portion heating means 40 for heating a side edge portion of the web material 20 are provided on both sides of each traveling line of the web material 20 between the conveying roller 31 and the conveying roller 32. As shown in FIG. 3, each side edge portion heating means 40 is movable forward and backward in the direction perpendicular to the traveling direction of the web material 20.

Figure 4:
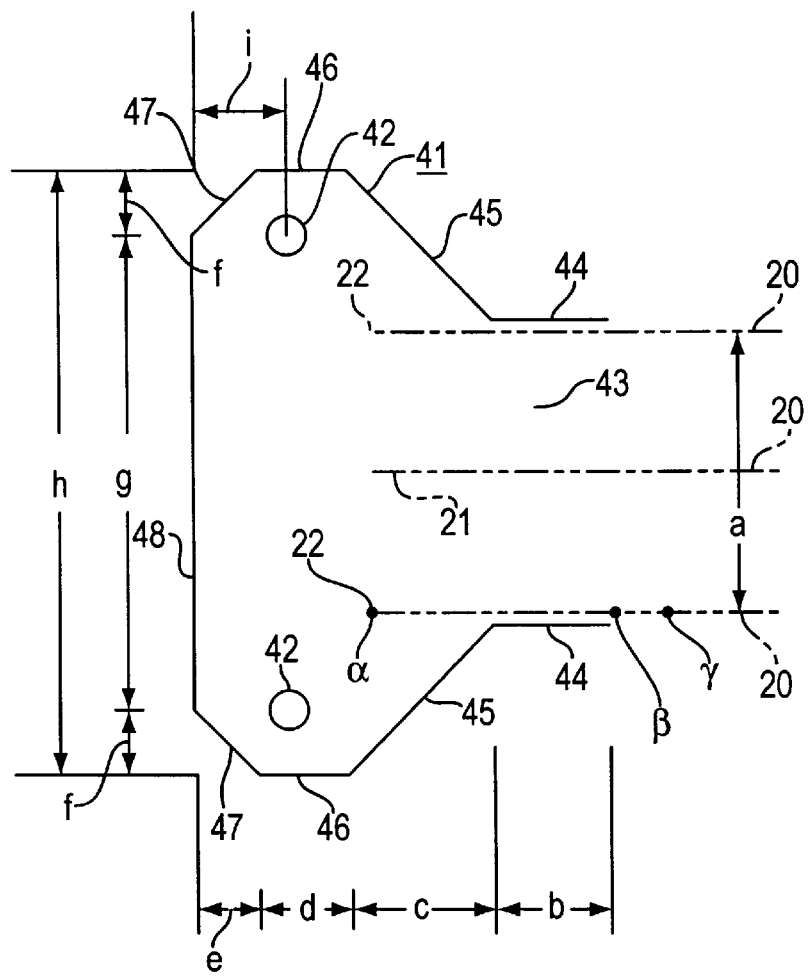

As shown in FIG. 4, the side edge portion heating means 40 is composed of a trough-formed member (surrounding member) 41 and a pair of heaters 42 provided in the trough-formed member 41 almost through the whole length. The web material side of the trough-formed member is opened to form a slit-formed opening 43 through the whole length so that a side edge portion 21 of the web material 20 can enter the inside of the trough-formed member 41. The trough-formed member 41 is formed of a back panel 48, back oblique panels 47 formed by folding the upper side and lower side of the back panel 48 at an angle of about 45 so as to be widened, top and bottom panels 46 formed by folding the front end of each back oblique panel 47 in the horizontal direction, front oblique panels 45 formed by folding the front end of the top and bottom panels 46 at an angle of about 45 degrees so as to be narrowed, and opening panels 44 formed by folding the front end of each front oblique panel 45 in the horizontal direction, A pair of heaters 42 are located at almost the same distance from the top or bottom panel 46 and the back oblique panel 47.

The size of the side edge portion heating means 40 is a=50 mm, b=20 mm, c=25 mm, d=15 mm, e=10 mm, f=10 mm, g=80 mm, h=100 mm, and i=15 mm in FIG. 4, respectively. In FIG. 4, "a" represents a moving range of the web material 20 in the vertical direction.

When flatness of the web material 20 is recovered by correcting elongation occurred at side edge portions 21 of the web material 20 using the above apparatus, the trough-formed members 40 located on the outside indicated by a dotted line in FIG. 3 is moved toward the inside (the full line in FIG. 3) so that the side edge portions 21 of the web material 20 is entered therein. At that time, referring to FIG. 4, it is set so that the point B which indicates the position at a distance of 30 mm from the edge of the web material 20 conforms with the end of the opening 43.

In this state, the traveling web material 20 is heated by the side edge portion heating means 40. The inside of the trough-formed member 41 has been heated by the heaters 42, and the side edge portion 21 located on the outside from the point β is heated to a temperature in the range from a glass transition temperature minus 40° C. to the melting point by the radiant heat directly from the heaters 42 and reflected by the front oblique panels 45, the top and bottom panels 46, the back oblique panels 47 or the back panel 48. On the other hand, the central portion of the web material 20 located on the central side from the point β is heated little, and accordingly, the previous state can be maintained without adverse effect by the heating.

Thus, the elongation the side edge portions 21 of the web material 20 is corrected by the heating, but the central portion keeps the initial state. Then, the side edge portions become a similar state to the central portion, and the web material becomes flat having a uniform thickness.

Figure 5:
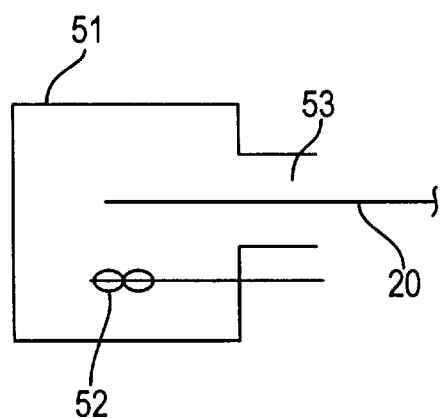
FIG. 5 is a partial front view section of another side edge portion heating means also embodying the invention.

Another embodiment of the side edge portion heating means 50 is shown in FIG. 5. The side edge portion heating means 50 is composed of a trough-formed member 51 and a heater 52 provided in the trough-formed member 51 almost through the whole length. The trough-formed member 51 has almost a square section with an opening 53 so as to enter the side edge portion 21 of the web material. The heater 52 is located under the center of the trough-formed member 51; and heats the side edge portion 21 of the web material 20 from the underside.

EXAMPLE

A flatness-recovering test was conducted as to a film web 1,500 mm in width 100 μm in thickness of a polyethylene naphthalate (PEN) resin having a glass transition point of 113° C. and a melting point of 250° C., using the above apparatus shown in FIGS. 1–4.

The PEN resin film web was wound into a roll with superposing polyethylene terephthalate films 15 mm in width, 15 μm in thickness, on both side edge portions of the film web as the spacers, and meanwhile heated at about 115° C. The completed roll was further heat-treated at about 115° C. for 24 hours. The heat-treated PEN resin film was elongated on both side edge portions, and was inferior in flatness as a whole.

After removing the spacers, the above heat-treated PEN resin film was fed to the apparatus shown in FIGS. 1–4 at a traveling speed of 20 to. 100 m/min, and the side edge portions about 20 mm in width from the edge (α) to the point (β) were heated at from 110° C. to 160° C. for a period of from 5 to 60 seconds.

Figure 6:
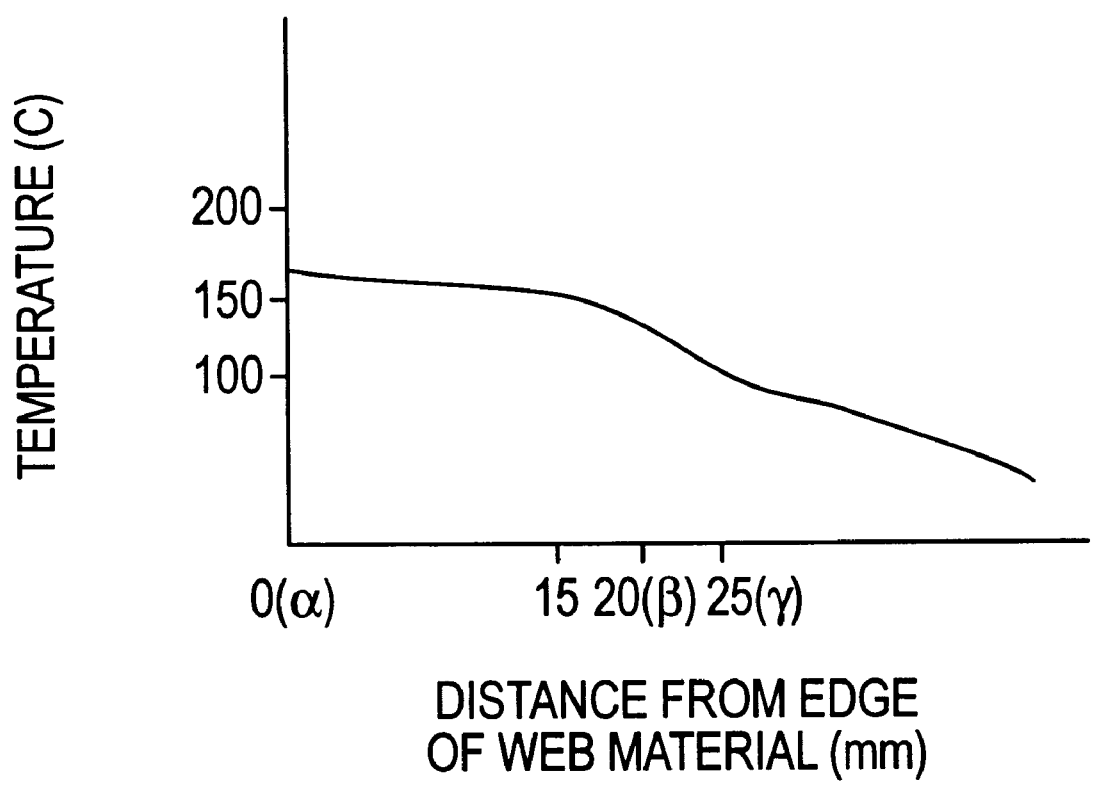
FIG. 6 is a graph indicating a relation between temperature and distance from an edge of the web material upon heating the web material by the apparatus for recovering flatness of a web material of the invention. The following reference numerals refer to the following structures.

A relation between the distance from an edge (α) of the web material and heated web temperature is shown in FIG. 6. As can be seen from the results of FIG. 6, the temperature of the position (γ) at a distance of 25 mm from the edge (α) was about 100° C. That is, the side edge portion between the edge and the point γ was heated to the glass transition temperature minus 40° C. or more, but the central portion from the point γ was not heated at a high temperature. By the above flatness-recovering treatment, the elongation on both side edge portions of the FEN resin film was corrected, and flatness of the PEN resin film was improved.

Having described our invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. An apparatus for recovering flatness of a web material comprising:

a plurality of conveying rollers for conveying the web material, and a side edge portion heating means which surrounds and heats a side edge portion of the web material traveling through said conveying rollers;

said side edge portion heating means including:

a trough-formed member having a back panel, two back oblique panels connected to said back panel, two front oblique panels, and a top panel and a bottom panel which connect each said two front oblique panels to each said two back oblique panels, respectively; and at least one heater disposed within said trough-formed member.

2. The apparatus of claim 1 wherein the conveying rollers are arranged alternately so that the web material travels through a serpentine path.

3. The apparatus of claim 1 wherein the trough-formed member has an opening for entering the side edge portion.

4. The apparatus of claim 3 wherein the number of heaters is plural and the heaters are located so as to heat the side edge portion from both sides.

5. The apparatus according to claims 3 or 4 wherein the heater(s) is an infrared heater.

6. The apparatus of claim 1 wherein the trough-formed member has a reflective inner surface.

7. The apparatus of claim 4, wherein each of the heaters is located in said trough-formed member at substantially an equal distance from one of said top panel and one of said two back oblique panels, and said bottom panel and the other of said two back oblique panels.

8. The apparatus of claim 3, wherein said side edge portion heating means is movable in a forward direction and a backward direction perpendicular to a traveling direction of the web material, such that said side edge portion of the web material enters and retracts from the opening.

* * * * *